(12) United States Patent
Ishida

(10) Patent No.: US 8,995,036 B2
(45) Date of Patent: Mar. 31, 2015

(54) PRINTING APPARATUS

(71) Applicant: Canon Kabushiki Kaisha, Tokyo (JP)

(72) Inventor: Yasushi Ishida, Tokyo (JO)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/019,935

(22) Filed: Sep. 6, 2013

(65) Prior Publication Data

US 2014/0071498 A1 Mar. 13, 2014

(30) Foreign Application Priority Data

Sep. 7, 2012 (JP) ................. 2012-196874

(51) Int. Cl.
*G03F 3/10* (2006.01)
*H04N 1/21* (2006.01)
*H04N 1/00* (2006.01)

(52) U.S. Cl.
CPC ....... *H04N 1/00543* (2013.01); *H04N 1/00496* (2013.01); *H04N 1/00551* (2013.01); *H04N 2201/0094* (2013.01)
USPC .......................................... 358/527; 358/296

(58) Field of Classification Search
CPC ..................... B65H 2220/01; B65H 2401/441; B65H 2601/324; B65H 2801/06; H04N 2201/0094; H04N 1/00925; H04N 2201/0082; H04N 2201/0091; H04N 1/00519
USPC ........ 358/527, 296, 442, 468; 347/3; 399/110
See application file for complete search history.

(56) References Cited

U.S. PATENT DOCUMENTS 5,241,353 A 8/1993 Maeshima et al.
5,844,687 A * 12/1998 Nagane et al. ................ 358/296
2011/0001284 A1 1/2011 Ohtsuki

FOREIGN PATENT DOCUMENTS

JP 2010-064437 A 3/2010

* cited by examiner

*Primary Examiner* — Charlotte M Baker
(74) *Attorney, Agent, or Firm* — Canon U.S.A., Inc., IP Division

(57) ABSTRACT

A printing apparatus includes a printing unit located inside a housing, a scanner unit including a cover located on top of the printing unit, and an operation unit configured to be opened and closed with respect to the housing. When the operation unit is opened, the operation unit moves to a position where the operation unit hinders the opening and closing of the cover, and a part of the printing unit is exposed.

15 Claims, 20 Drawing Sheets

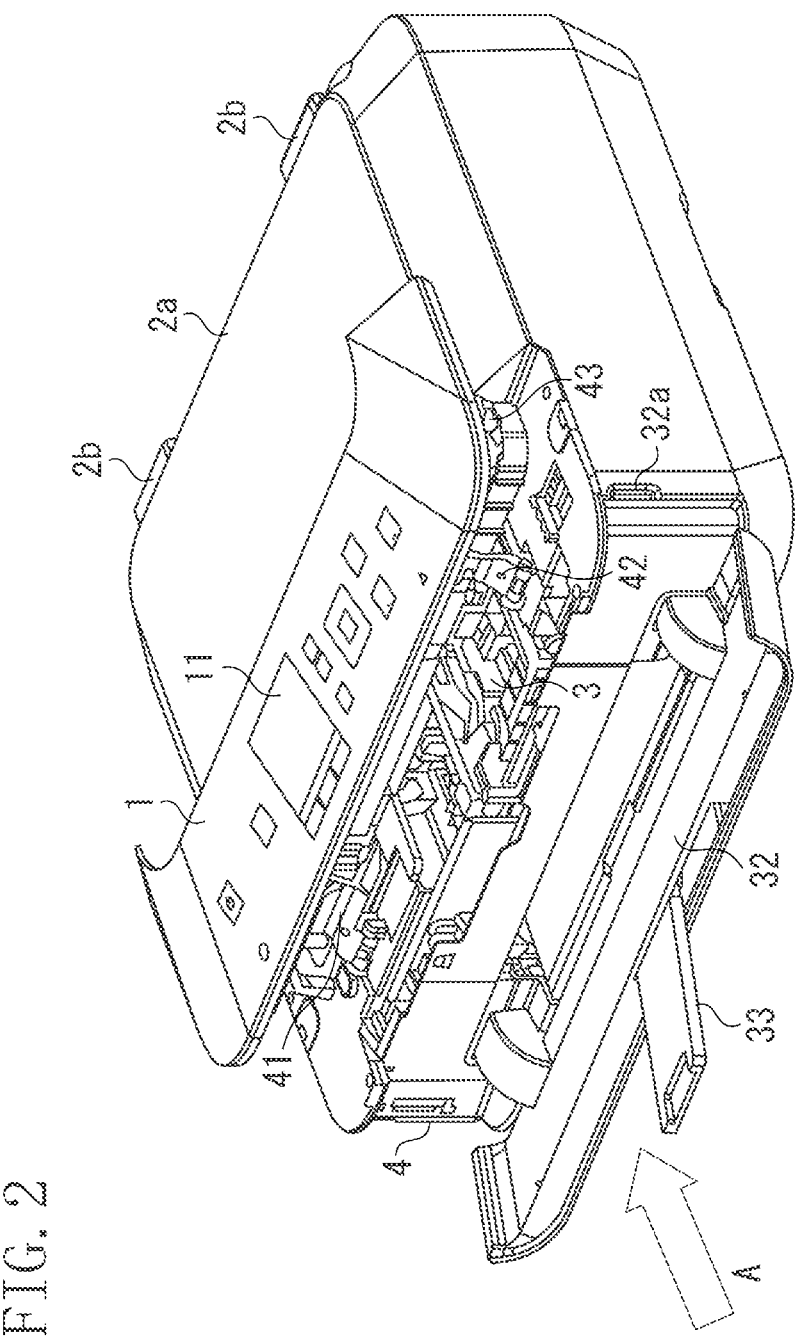

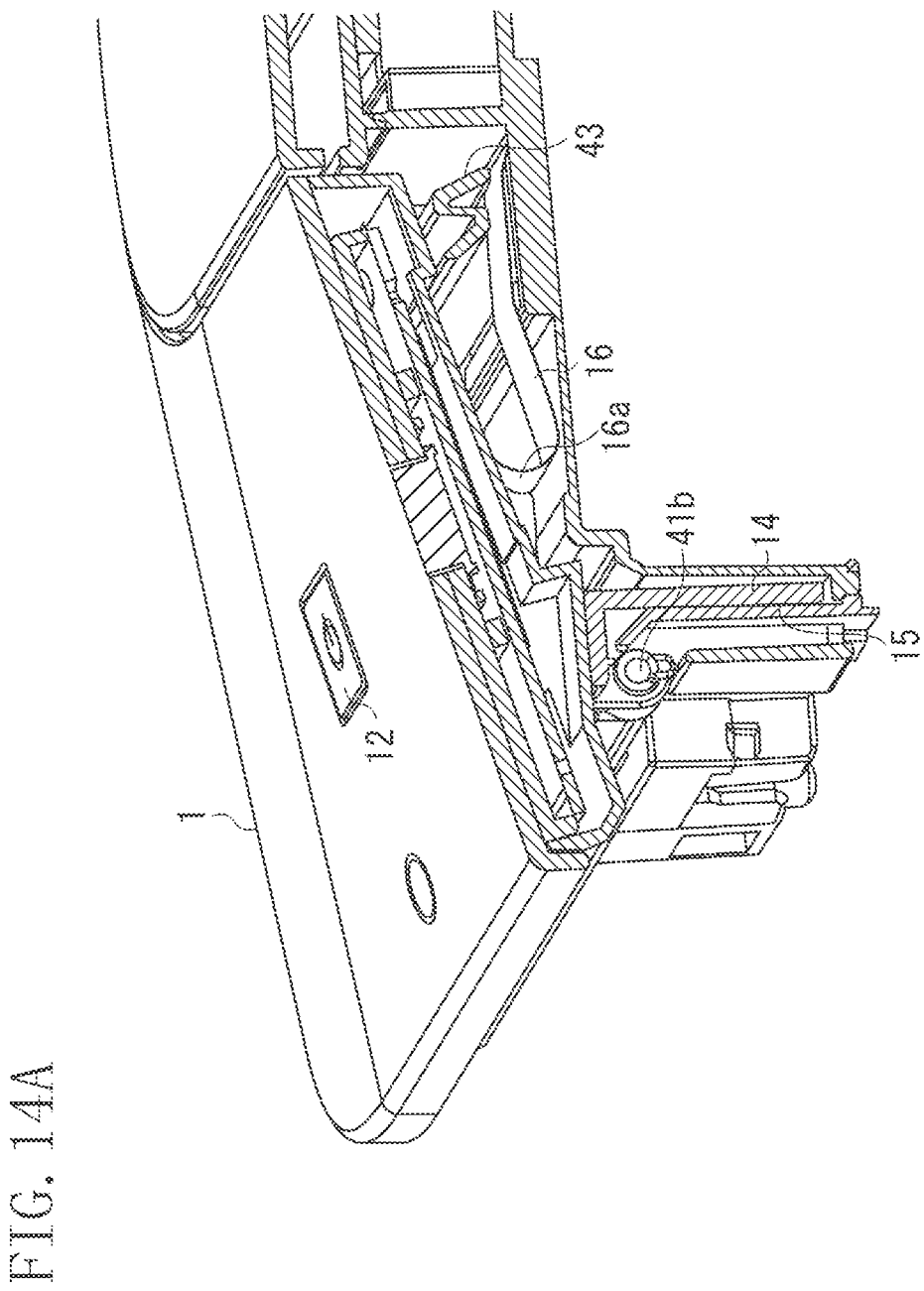

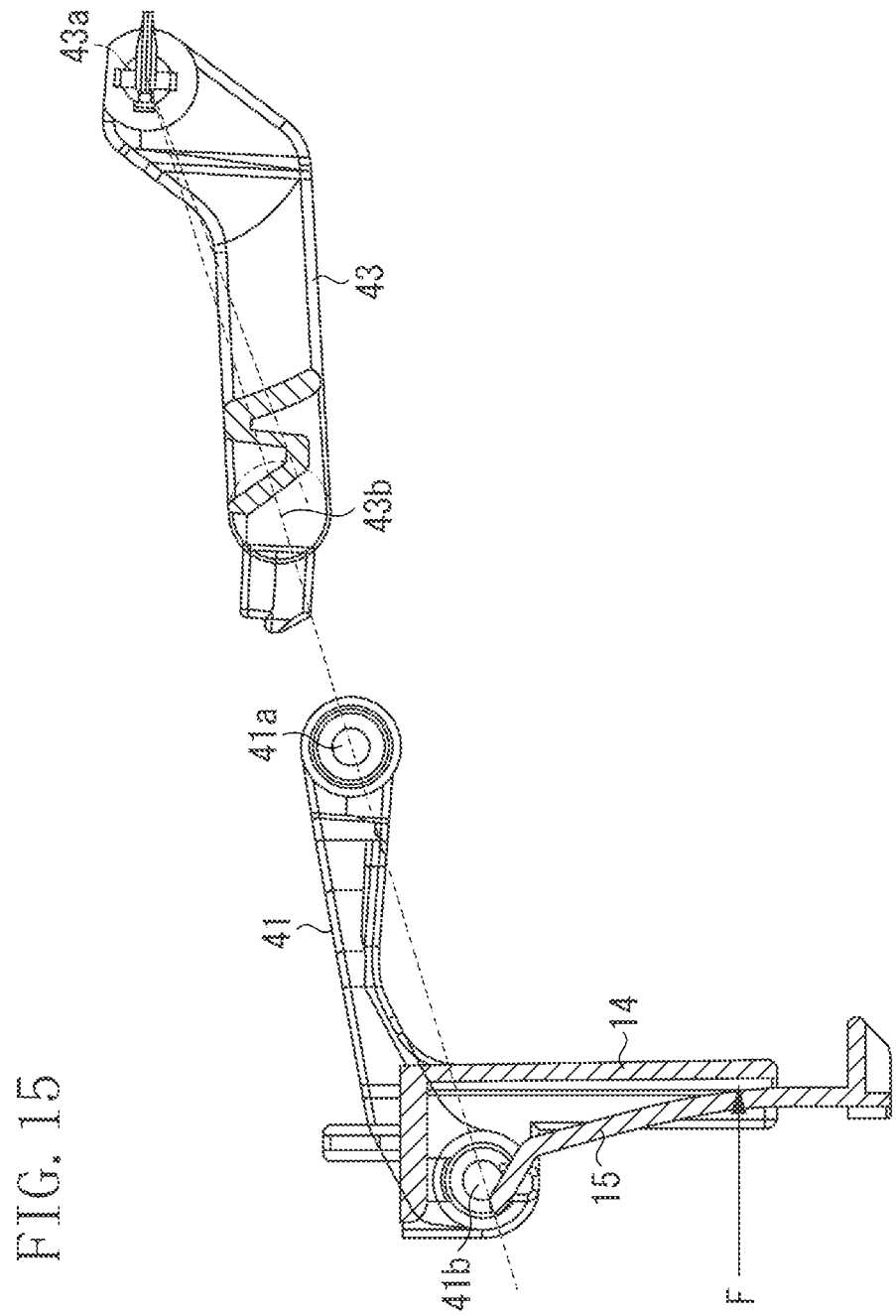

PRINTING APPARATUS

BACKGROUND

1. Field

Aspects of the present invention generally relate to a printing apparatus configured to perform printing on sheets.

2. Description of the Related Art

Japanese Patent Application Laid-Open No. 2010-64437 discusses a printer that is equipped with a large display. In this apparatus, the display on the front side can slide horizontally or vertically with respect to the housing. When the display is slid, an opening appears, and a user is allowed access to a printing unit inside the housing for maintenance. An indication for the maintenance is given on the display.

Nowadays, instead of the single-function printer, a multi-function peripheral (multifunction printer) in which the printer and the scanner are integrated with each other is being spread. For such an apparatus, the mainstream layout is one in which a flat bed type scanner is arranged on a printing mechanism.

Japanese Patent Application Laid-Open No. 2010-64437 discusses a single-function printer, and teaches nothing about the integration of the scanner. Even if the display which is configured to slide as discussed in Japanese Patent Application Laid-Open No. 2010-64437 were to be mounted in a multifunction printer, the flat bed scanner occupying a large volume on top of the printing mechanism would constitute an obstacle, so that it would be difficult to enlarge the opening allowing access to the interior of the apparatus.

SUMMARY

Aspects of the present invention are generally directed to a layout for a printing apparatus integrating a printer and a scanner, wherein maintenance of the interior of the apparatus is facilitated.

According to an aspect of the present invention, a printing apparatus includes a printing unit located inside a housing, a scanner unit, including a cover, located above the printing unit, and an operation unit including an display, the operation unit configured to be opened with respect to the housing, wherein, in a case where the operation unit is opened, the operation unit hinders opening and closing of the cover and a part of the printing unit is exposed.

In the printing apparatus according to the below embodiment(s), maintenance of the interior of the apparatus is easy to perform, and the cover of the scanner can be prevented from being inadvertently opened during maintenance.

Further features and aspects of the present disclosure will become apparent from the following description of exemplary embodiments with reference to the attached drawings.

BRIEF DESCRIPTION OF THE DRAWINGS

FIG. 2 is a perspective view illustrating a state where an operation unit and a front door are opened.

FIGS. 14A and 14B are diagrams illustrating the state of an urging member when opening the operation unit.

FIG. 15 is a diagram illustrating the positional relationship between the ink mist cover and the urging member.

DESCRIPTION OF THE EMBODIMENTS

As an exemplary embodiment, a printing apparatus (a multifunction peripheral) integrating a printer and a scanner with each other will be described. This embodiment is not limiting, e.g., a printing apparatus having no scanner is also applicable.

Figure 1:
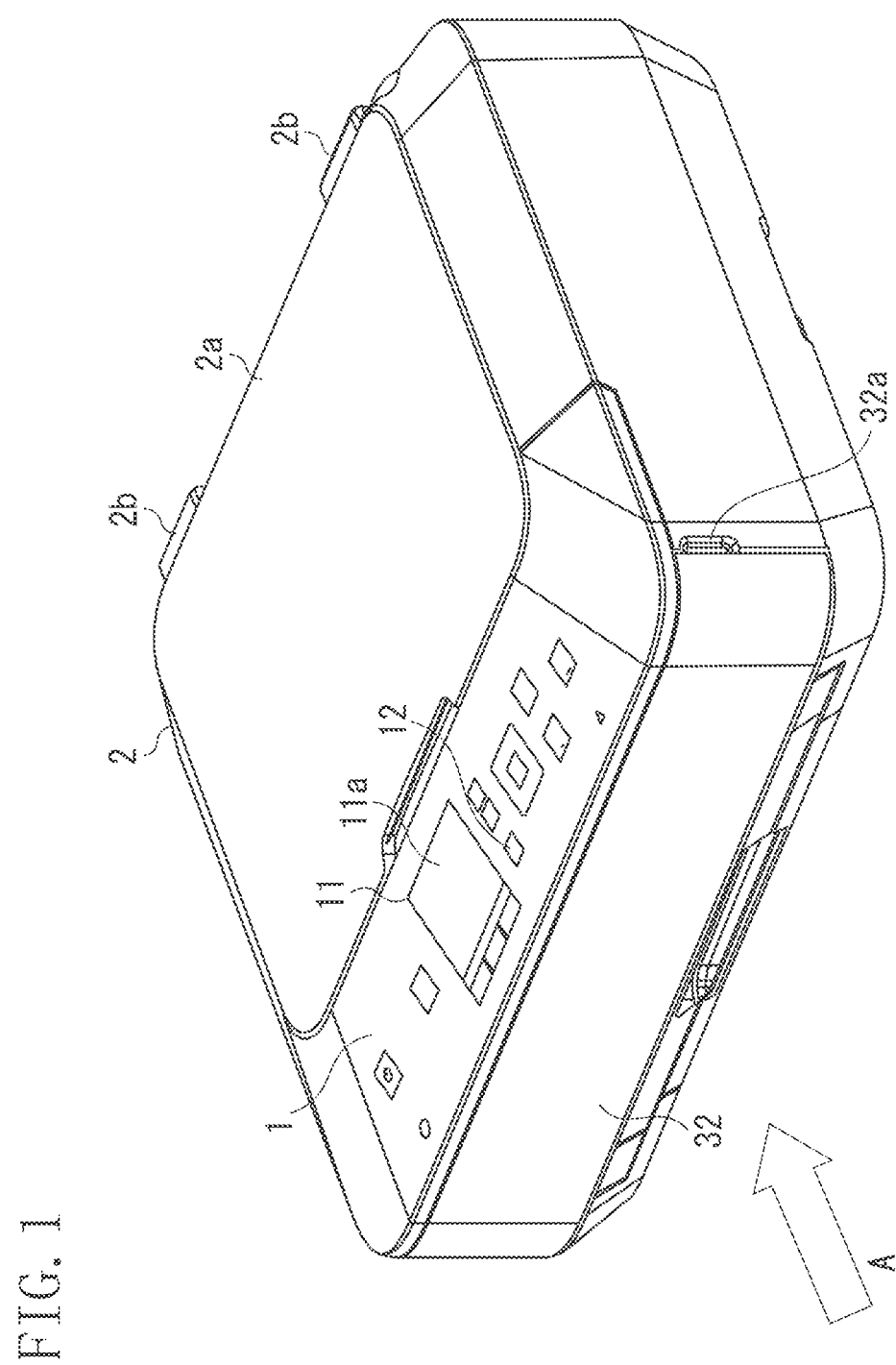
FIG. 1 is an external perspective view of a printing apparatus according to an exemplary embodiment.

FIG. 1 is an external perspective view of a printing apparatus according to the present exemplary embodiment. FIG. 2 is a perspective view illustrating the state in which the operation unit and the front door of the printing apparatus are open.

Roughly speaking, the printing apparatus is equipped with an operation unit 1, a scanner unit 2, a printing unit 3, a front door 32, and a control unit (a control circuit board provided inside the housing of the printing apparatus). At the time of use, the user faces the printing apparatus in the direction of the arrow A. In the present specification, regarding the apparatus installed in the environment of use, the side nearer to the user facing the apparatus in the direction of the arrow A will be referred to as the front side, and the side farther from the user in this direction will be referred to as the rear side. Its upper and lower sides will be defined according to the gravitational direction.

The operation unit 1 is provided on the front side of the scanner portion 2. On the panel on the upper surface of the operation unit 1, a display 11 consisting of a liquid crystal display (LCD), an organic light-emitting diode (OLED) or the like, and a plurality of input keys 12 are provided. The input keys 12 include a color copying start key, a monochrome copying start key, a stop key, an arrow key, and a power button.

To achieve an enhancement in visibility and operability for the user operating in the direction of the arrow A, the panel of the operation unit 1 is slightly inclined toward the front side with respect to the horizontal direction. The display 11 may be one of which display surface 11a constitutes a touch panel allowing input operation. Further, the display 11 may rise up with respect to the panel of the operation unit by virtue of a hinge.

The scanner unit 2 consists of a flat bed type scanner in which a document table (a transparent glass plate) on which a document is to be placed is pressed by a pressure cover 2a (a document pressure plate). Provided inside the document table is the scanner unit including a line sensor for optically reading the document, and a carriage. The pressure cover 2a can be opened and closed with respect to the document table around two hinges 2b on the apparatus depth side. Formed on the front side of the pressure cover 2a is a cutout to be hooked by a finger when the user opens the cover.

Instead of the pressure cover 2a, an auto sheet feeder (ASF) configured to automatically feed a plurality of documents successively onto the document table maybe provided. Also in this case, the auto sheet feeder can be opened and closed with respect to the document table by virtue of similar hinges.

The printing unit 3 is accommodated within the housing of the apparatus. In the state of FIG. 1, the printing unit 3 is not visible from the outside of the housing. The printing unit 3 has an inkjet type printing head, and a carriage facing the sheet and configured to reciprocate in the sheet width direction while carrying the printing head and a plurality of ink tanks corresponding to a plurality of colors. The operation of discharging ink from the printing head while moving the carriage to achieve a 1-band printing, and the operation of sheet stepwise feeding, are repeated, whereby serial printing is performed. Instead of using a carriage, line printing may be performed by means of a line printing head. Further, the printing system is not restricted to the ink jet system. Some other printing system such as the electrophotographic system may be employed, the thermal system, or the thermal transfer system.

The front door 32 is provided on the front side of the apparatus housing, and can be opened to the front side by virtue of two hinges. In the open state, it has a sheet stacking surface that can support a plurality of sheets that undergo printing at the printing unit 3 before being discharged.

In this configuration, to place the apparatus from the state illustrated in FIG. 1 (the closed state) into the state illustrated in FIG. 2 (the open state), the user first opens the front door 32 to the front side. Then, the user lifts the operation unit 1 on the upper side. As described below, the operation unit 1 is configured to make parallel movement upwardly and to the rear side while maintaining the same orientation due to the parallel link mechanism. In this way, transition to the state of FIG. 2 is effected. Then, there appears an opening allowing maintenance on the printing portion. Further, there appears a card slot 4 into which a memory card for taking in images is to be inserted.

Before the operation unit 1 is placed in the open state, the front door 32 is open to the front side, so that the user is easily allowed access in the direction of the arrow A. The user can access the printing unit inside the apparatus via the opening to perform various maintenance operations. Examples of the maintenance operations include the following:

(1) Jamming Restoring Operation

When the printing medium involves jamming during printing, the user performs this operation to remove the medium that has got stuck. When the apparatus detects jamming, the display 11 indicates the position where the jamming has occurred, the operational procedures for restoration, etc. for the convenience of the user performing the maintenance operation.

(2) Ink Tank Replacing Operation

In this operation, the user replaces an empty ink tank with a new one. When the operation unit 1 is opened, the carriage of the printing unit automatically moves to the vicinity of the opening to enable the replacing operation. At this time, the display 11 indicates the ink tank needing replacement, the operational procedures, etc. for the convenience of the user performing the maintenance operation.

The operation by which the user opens the operation unit 1 will be described in more detail with reference to FIGS. 3A through 3D. FIGS. 3A through 3D are diagrams illustrating the apparatus front side portion as seen from the lateral side. FIGS. 3A through 3D illustrate a series of operations in chronological order.

Figure 3A:
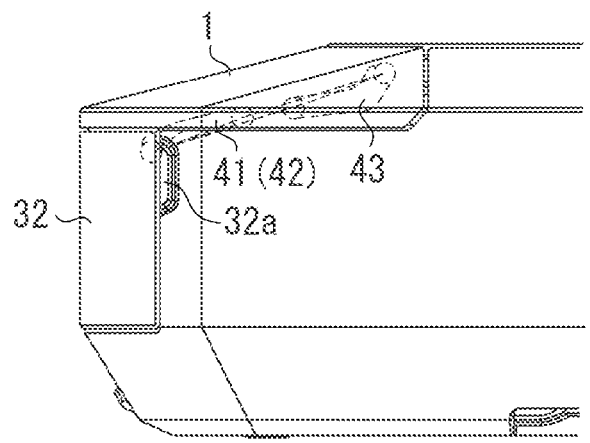
FIGS. 3A, 3B, 3C, and 3D illustrate how the user performs the operation of opening the operation unit.
Figure 3B:
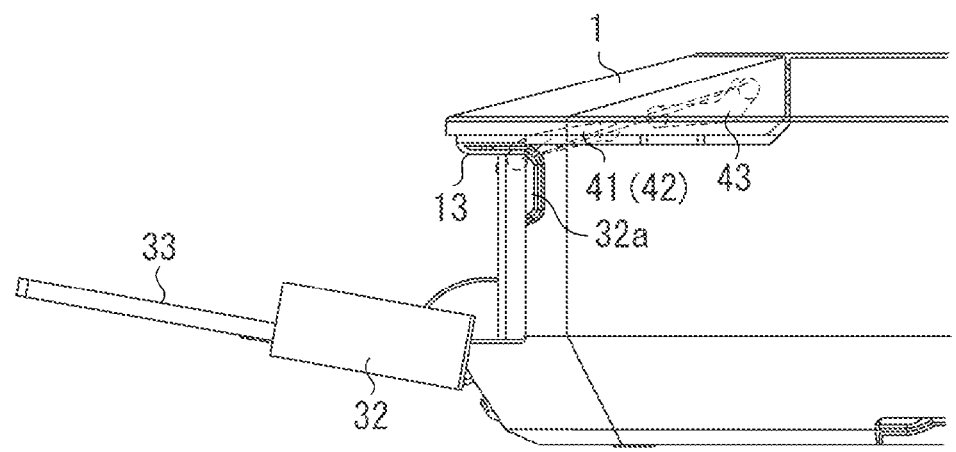

FIG. 3A illustrates the state in which both the operation unit 1 and the front door 32 are closed. The user first inserts fingertips into two recesses 32a formed in both apparatus side surfaces adjacent to the front door 32. Then, the user pulls both ends of the front door 32 to the front side to open the front door 32 to the front side. FIG. 3B illustrates the state in which the front door 32 is opened. When the front door 32 is opened, an extension tray 33 automatically pops out to the front side. The extension tray 33 as an extender is accommodated in the front door 32, and when the front door 32 is opened, the extension tray 33 rotates like a collapsible knife to pop out of the front door. Conversely, when the front door 32 is closed, the extension tray rotates like a collapsible knife to be accommodated in the front door. The front door 32 is not restricted to one to be opened by the user with the user's fingers. It is also possible to employ a system in which, by depressing an opening/closing button, a stopper is detached to automatically rotate the front door to be opened. Alternatively, it is also possible for the front door 32 to be automatically opened by a command from the control unit at the time of printing.

When the front door 32 is opened, there appears a bottom portion 13 on the front side of the operation unit 1, which has been hidden by the front door 32. The bottom portion 13 serves as a hook portion on which a finger of the user is to be hooked to upwardly move the operation unit 1. That is, when the front door 32 is opened, the hook portion for enabling the user to open the operation unit 1 appears, and when the front door 32 is closed, the hook portion is hidden by the front door.

Figure 3C:
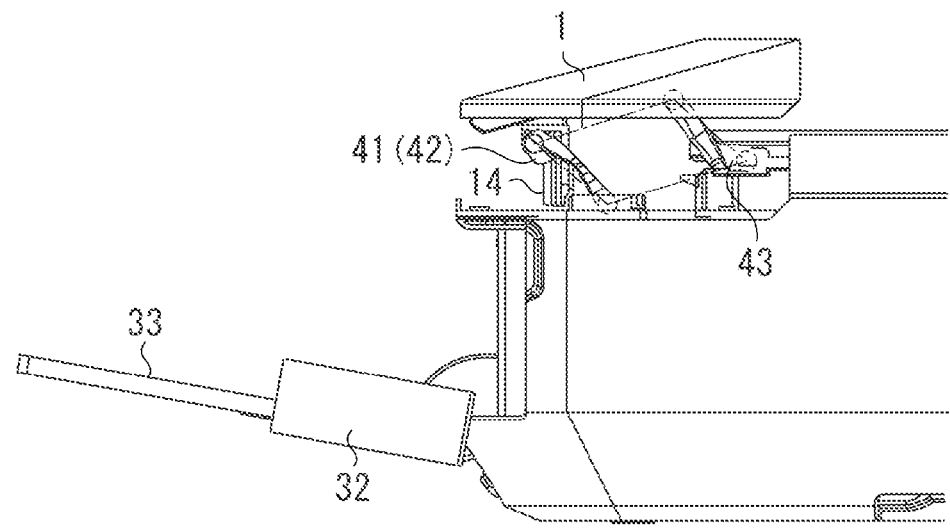
Figure 3D:
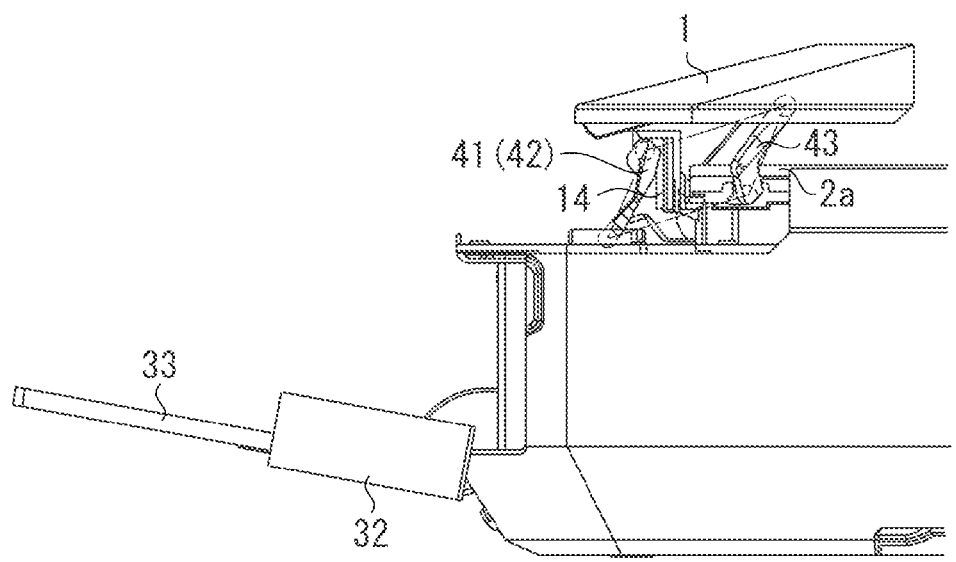

The user hooks a finger cushion on the bottom portion 13 to lift the operation unit 1. FIG. 3C illustrates the state in which the lifting has begun. When the operation unit 1 is further moved, the operation unit 1 is transferred to the rear side while maintaining the parallelism owing to the parallel link mechanism. FIG. 3D illustrates the state in which the transfer has been completed, and the operation unit 1 has been opened to the full.

In the state of FIG. 3D, the upper portion on the front side of the pressure cover 2a of the scanner unit is covered with a part of the operation unit 1. If an attempt is made to open the pressure cover 2a, physical interference of the operation unit 1 hinders the opening of the pressure cover 2a. Thus, the scanner cover can be prevented from being inadvertently opened during maintenance. For example, even if the user greatly tilts the apparatus or topples it upside down during maintenance, the situation in which the pressure cover 2a is spontaneously opened can be prevented owing to the interference with the operation unit 1.

Further, during maintenance, the printing head automatically moves to the vicinity of the opening for performing the ink tank replacement operation. In this state, the nozzle from which ink is to be discharged is open to the air, and no ink is discharged, so that nozzle clogging or defective discharge is likely to occur due to this ink-dry state. If the scanner can be operated in the state of FIG. 3D, the ink-dry state will proceed since it takes time to perform image reading. In the present exemplary embodiment, in the state of FIG. 3D, owing to the interference of the operation unit 1, the user is prevented from opening the pressure cover 2a and performing reading with the scanner, so that the above-mentioned situation can be prevented from occurring.

In this way, when the operation unit 1 is opened, the operation unit 1 moves to a position where it hinders the opening and closing of the pressure cover 2a, and at least a part of the printing unit 3 is exposed and visible from the outside of the housing. Thus, the maintenance on the interior of the apparatus is easy to perform, the scanner cover can be prevented from being inadvertently opened during the maintenance, and the user can be prevented from performing image reading with the scanner.

Figure 4:
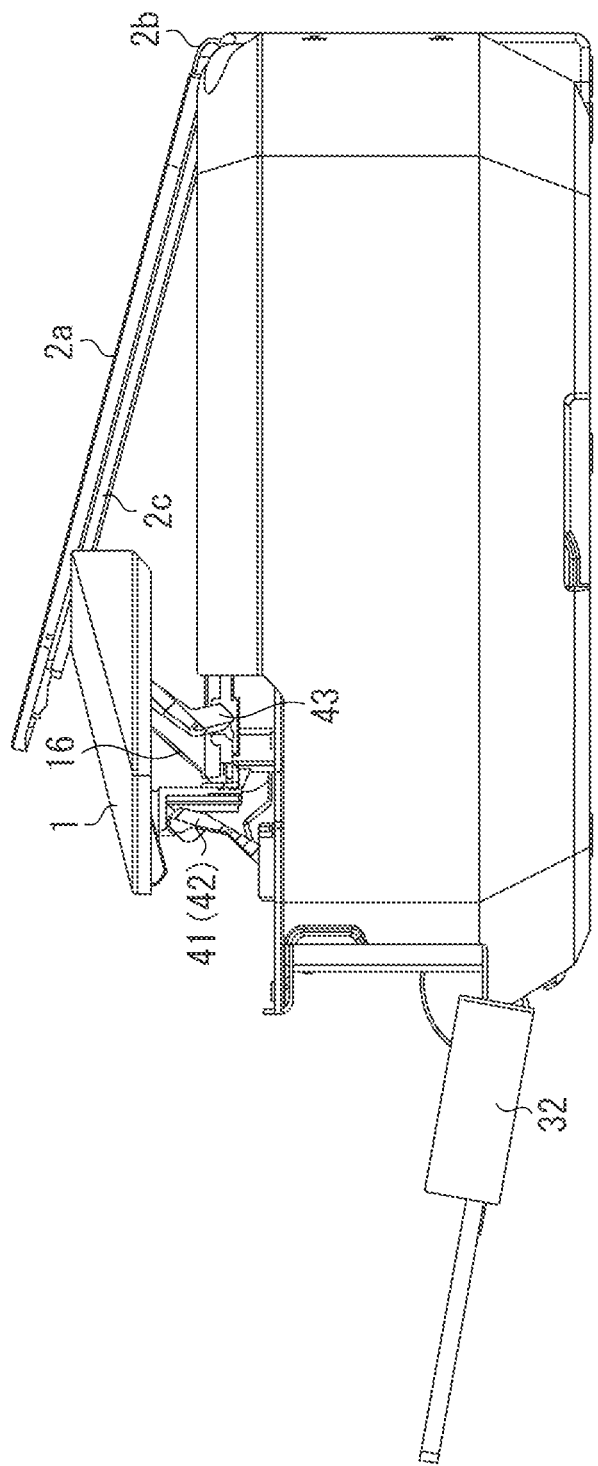
FIG. 4 is a diagram illustrating how a pressure cover interferes with the opened operation unit.

If, with the pressure cover 2a having been intentionally opened by the user, the operation unit 1 is opened, the pressure cover 2a cannot be closed. FIG. 4 illustrates that state. A portion of the inner side surface 2c of the pressure cover 2a abuts on a corner of the operation unit 1, disabling the pressure cover 2a to be further closed. The inner side surface 2c consists of a white sheet equipped with a shock absorber (for example, sponge). Thus, the shock absorber serves as a cushion, and, if the pressure cover 2a is closed sharply, there is no fear of the panel of the operation unit and the white sheet being flawed. The material of the shock absorber is not restricted to sponge. Any other material will do so long as it exerts a shock absorbing function.

Figure 5:
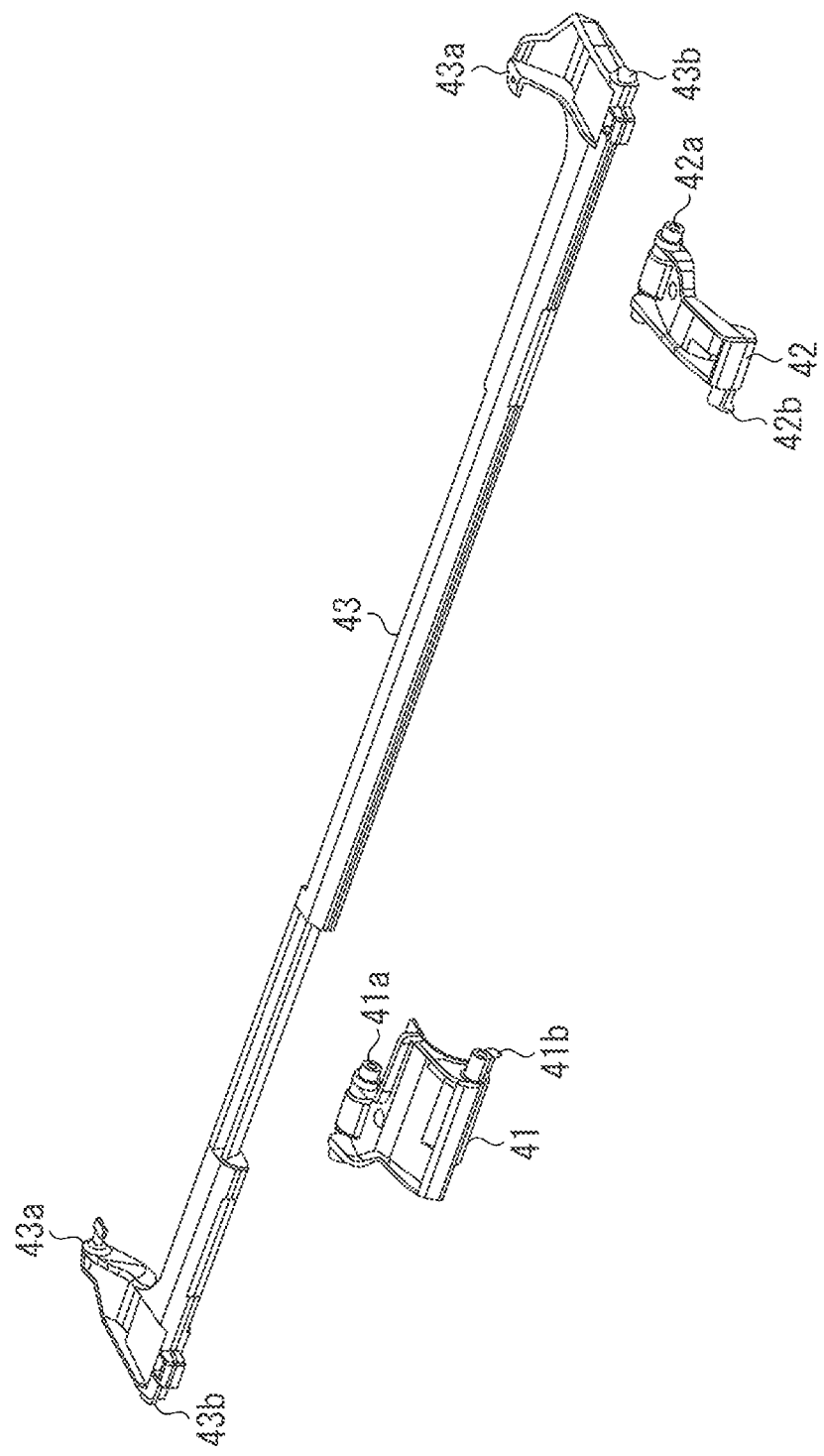
FIG. 5 is a component diagram exclusively illustrating three link components.
Figure 6:
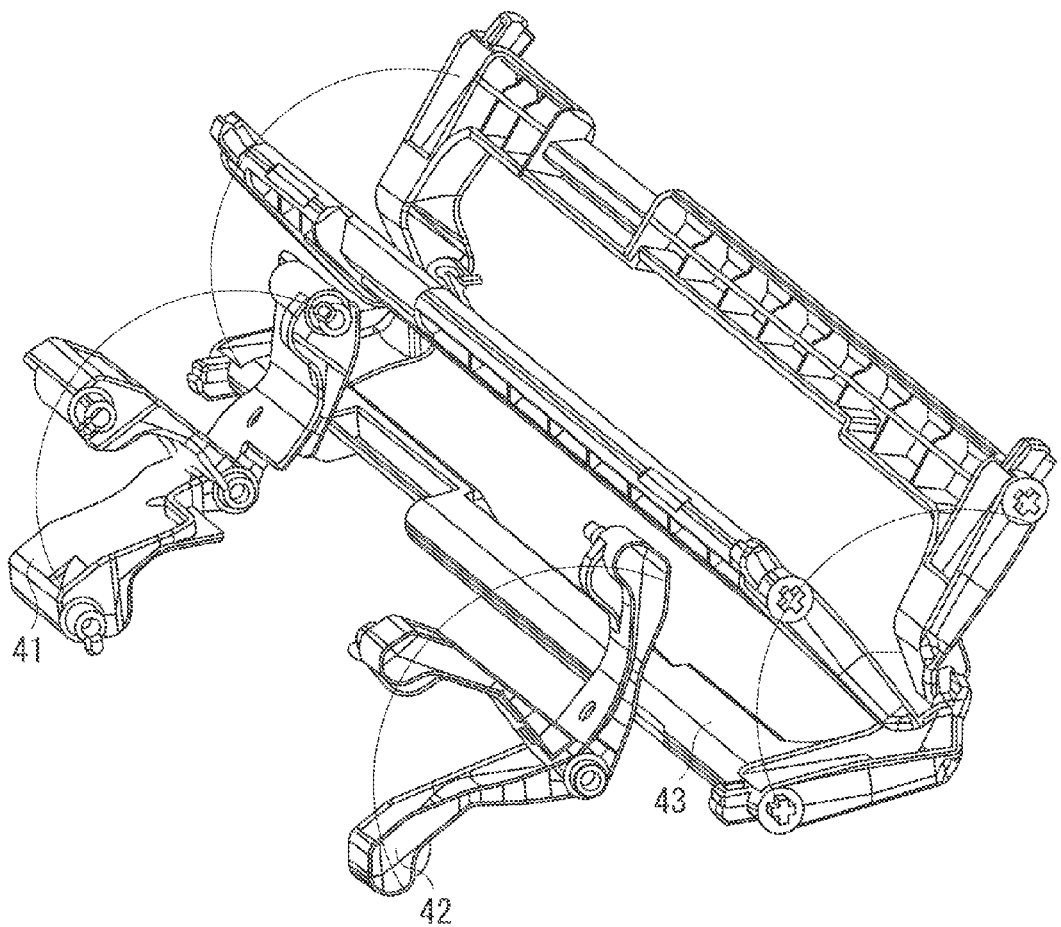
FIG. 6 is an explanatory view for illustrating the movement of a parallel link mechanism.
Figure 7:
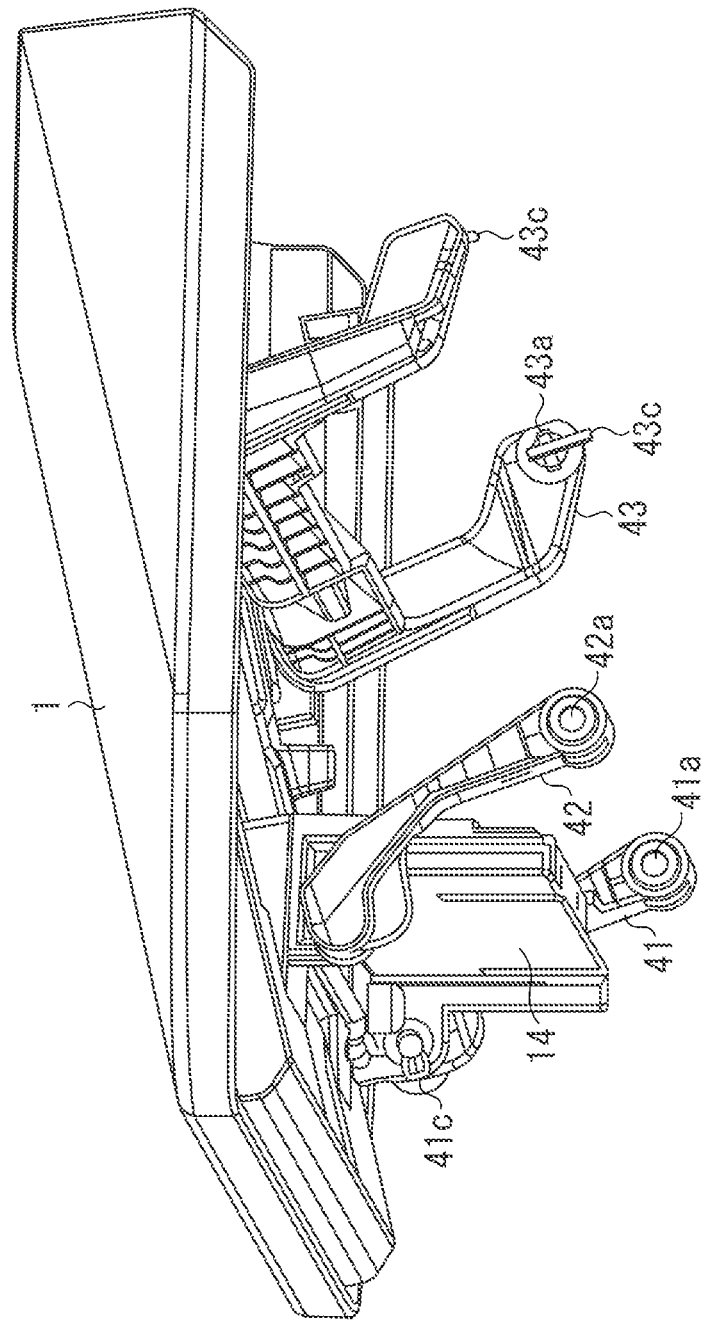
FIG. 7 is a perspective view illustrating how the parallel link mechanism connected to the operation unit is.

The parallel link mechanism will be described in detail with reference to FIGS. 5 through 7. FIG. 5 is a component diagram exclusively illustrating three link components. FIG. 6 is an explanatory view for illustrating the movement (path) of the parallel link mechanism. FIG. 7 is a perspective view illustrating how the parallel link mechanism is connected to the operation unit.

The parallel link mechanism is composed of three components including a left front link arm 41 on the apparatus front side, a right front link arm 42, and a rear link arm 43 on the apparatus rear side. The left front link arm 41 and the right front link arm 42 are independent. They support the front side of the operation unit 1 at two right and left positions with respect to the housing. The rear link arm 43 is a single component, and supports the rear side of the operation unit 1 at two positions while being supported at two positions on the housing side.

Shaft portions 41a and 41b are formed at both ends of the left front link arm 41. Similarly, shaft portions 42a and 42b are formed at both ends of the right front link arm 42. The shaft portions 41a and 42a are rotatably supported by the apparatus main body, and the shaft portions 41b and 42b are rotatably supported by the front side of the bottom surface of the operation unit 1 (the side surface of an ink mist cover 14 described below). The rear link arm 43 also has shaft portions 43a and 43b at both ends thereof. The shaft portion 43a is rotatably supported by the apparatus main body, and the shaft portion 43b is rotatably supported at two positions on the depth side of the bottom surface of the operation unit 1.

When the operation unit 1 moves, the inter-center distance between the shaft portions 41a and 41b, the inter-center distance between the shaft portions 42a and 42b, and the inter-center distance between the shaft portions 43a and 43b are all maintained equal, and, when seen sidewise, the three links move while maintaining the parallelogram. This parallel link mechanism is a "four parallel link mechanism." The operation unit 1 can be smoothly translated, with the panel surface, that is, the indication surface of the display, maintaining substantially the same orientation (angle). The rear link arm 43 is integrated as a single component, so that even if the user lifts the operation unit 1 without maintaining the horizontal symmetry, and a force in a torsional direction is applied to the parallel link mechanism, the deformation only occurs to a small degree, and a smooth movement is maintained.

Figure 8:
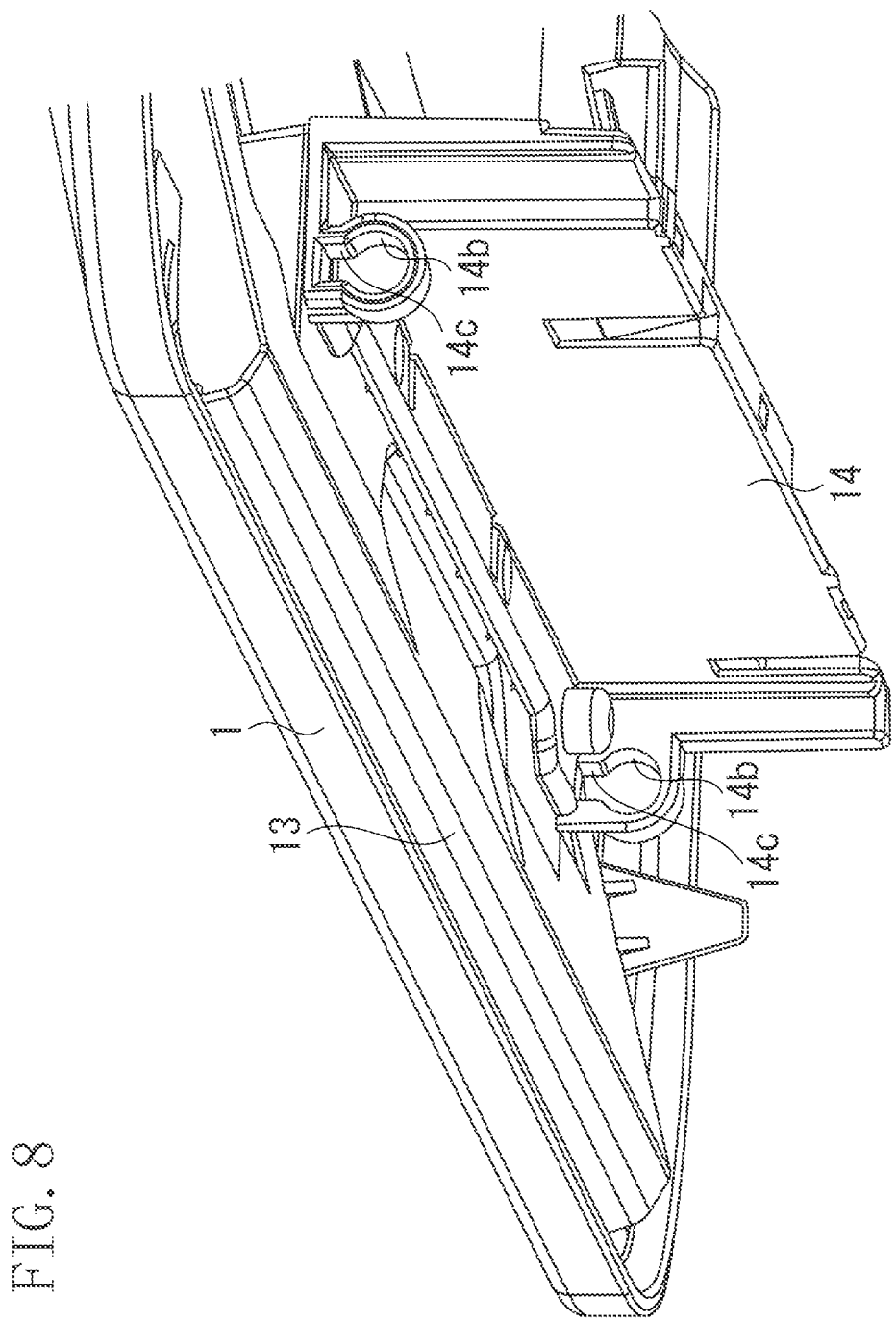
FIG. 8 is a diagram illustrating an ink mist cover provided at a bottom portion of the operation unit.

In FIGS. 7 and 8, on the front side of the lower surface of the operation unit 1, there is provided an ink mist cover 14 as a partition wall interrupting the ink mist flow. On both the right and left sides of the ink mist cover 14, there are provided holes 14b to be engaged with the shaft portions 41b and 42b of the left front link arm and the right front link arm 42.

In a state in which the operation unit 1 is totally open, the ink mist cover 14 exists as a partition wall on the front side of the printing unit 3, and covers substantially entire the opening. The ink mist flow generated in the printing unit 3 during printing operation is interrupted by the ink mist cover 14 constituting a partition wall, suppressing leakage of ink mist to the exterior of the apparatus through the opening. During maintenance, the ink mist cover 14 is retracted to a position where it does not hinder access to the printing unit, so that the maintenance operation can be efficiently performed.

Figure 9:
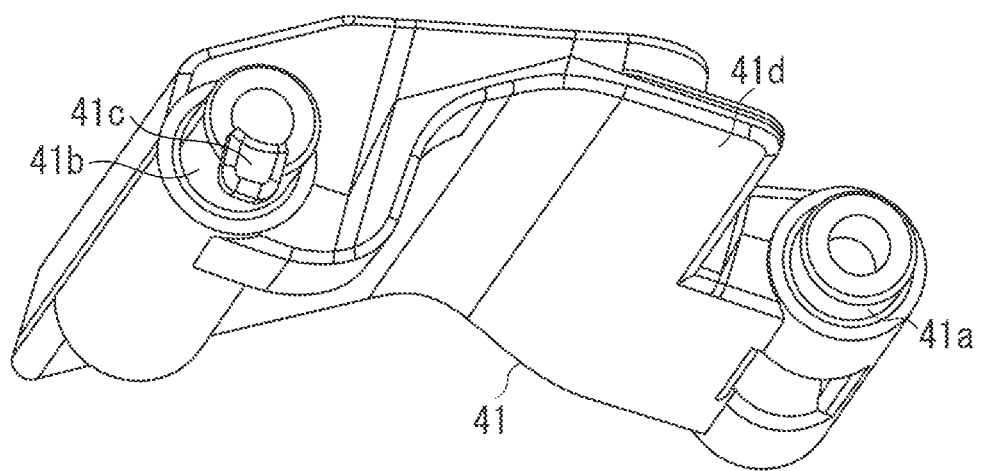
FIG. 9 is a perspective view illustrating the structure of a shaft portion of a front link.

The link rotational fitting portions will be described in detail. As illustrated in FIG. 8, a cutout 14c is formed so as to be adjacent to each of the holes 14b provided in the ink mist cover 14 and configured to be engaged with the shaft portions 41b and 42b. Further, as illustrated in FIG. 9, a detachment prevention hook 41c is provided at an end portion of the shaft portion 41b of the left front link arm 41. This also applies to the right front link arm 42.

Within the opening/closing movement range of the operation unit 1, the hook 41c and the cutout 14c are in a phase relationship in which the hook 41c and the cutout 14c are not matched with each other. At the time of assembly, when incorporating the link arm 41 into the ink mist cover 14, the hook 41c is inserted aligned with the cutout 14c. After this, the hook 41c is rotated to shift the phase. As a result, the hook 41c functions as a detachment preventing element, and there is no fear of the shaft portion being detached from the hole at the time of opening/closing the operation unit.

Figure 10:
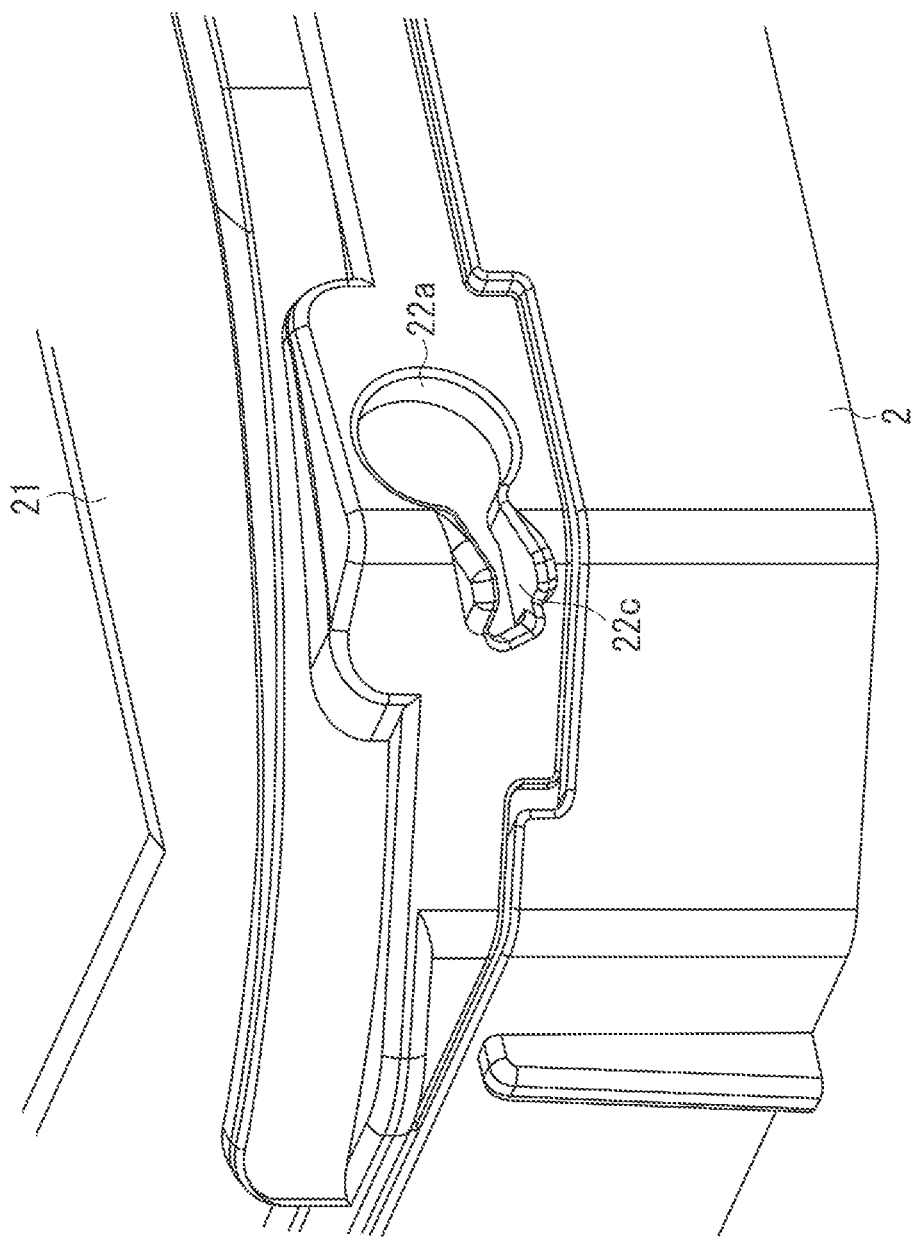
FIG. 10 is a perspective view illustrating the structure of a fitting portion of a rear link.
Figure 11:
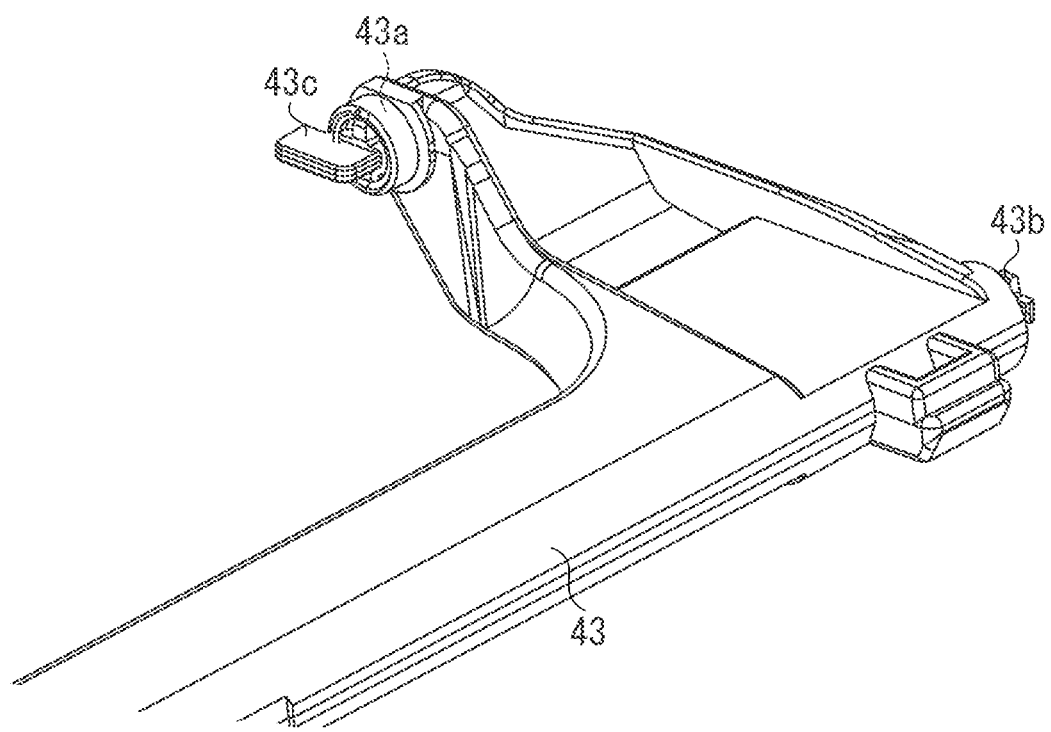
FIG. 11 is perspective view illustrating the structure of a shaft portion of a rear link.

Similarly, as illustrated in FIG. 10, the document table 21 on top of the scanner unit 2 has a hole 22a to be engaged with the shaft portion 43a of the link arm 43. Further, a cutout 22c is formed so as to be adjacent to the hole 22a. Further, as illustrated in FIG. 11, a detachment prevention hook 43c is provided at an end portion of the shaft portion 43a on the rear link arm 43 side. Within the opening/closing movement range of the operation unit 1, there is maintained a movement relationship in which the hook 43c and the cutout 22c are not matched with each other. As a result, the hook 43c functions as a detachment prevention element, preventing the shaft portion from being detached from the hole at the time of opening and closing of the operation unit. The assembly method is the same as that for the hook 41c and the cutout 14c.

Figure 12A:
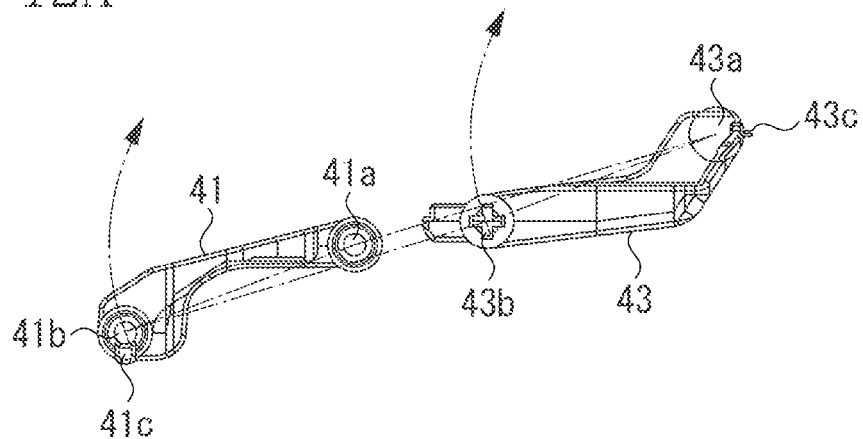
FIGS. 12A, 12B, 12C, 12D, and 12E are diagrams illustrating the movement of the fulcrum of each link of the parallel link mechanism at the time of opening and closing.
Figure 12B:
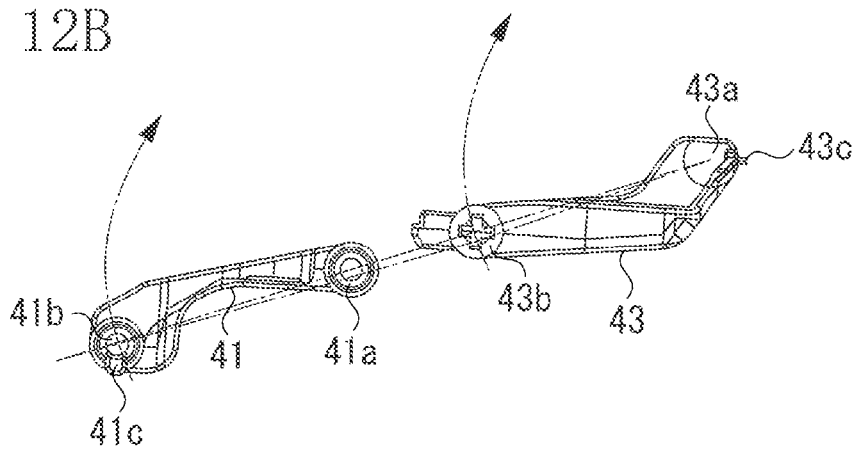
Figure 12C:
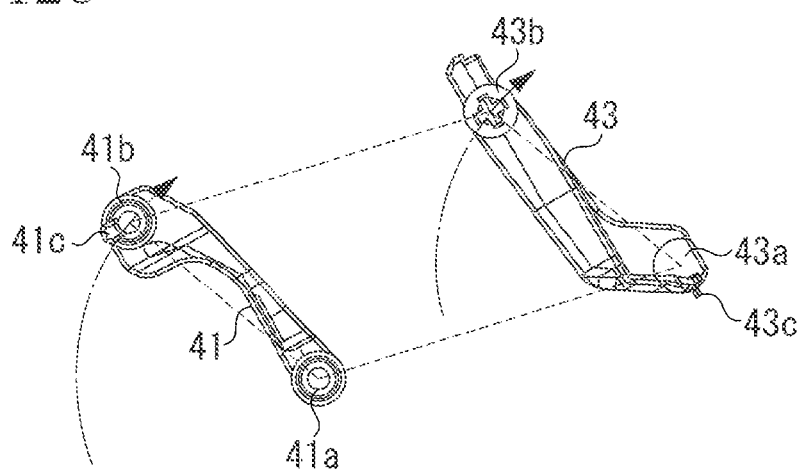
Figure 12D:
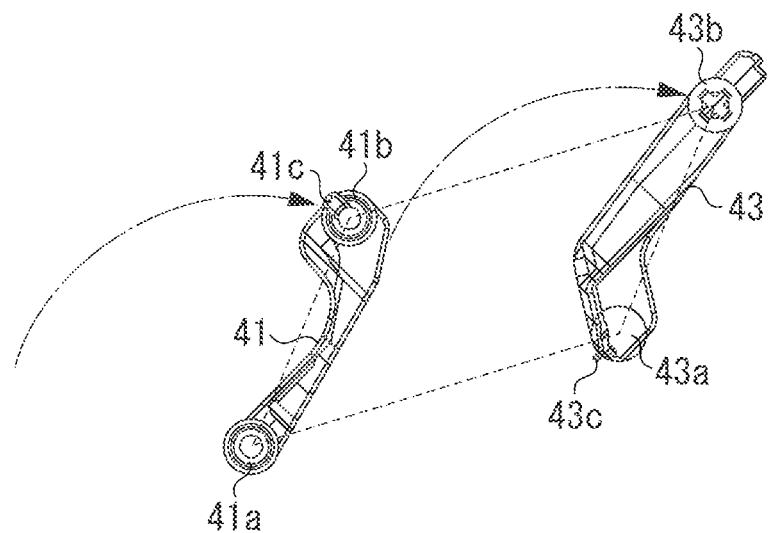

FIGS. 12A through 12E are diagrams illustrating the movement of the fulcrum of each link of the parallel link mechanism when the operation unit 1 moves from the totally closed state to the totally open state. FIG. 12A illustrates the totally closed state, FIG. 12B illustrates the state in which the operation unit is open by 4 degrees, FIG. 12C illustrates the state in which the operation unit is open by 60 degrees, and FIG. 12D illustrates the totally open state (in which the operation unit is open by 135 degrees). As described above, the three links constitute a four parallel link mechanism configured to move while maintaining a parallelogram. Thus, as illustrated in FIG. 12, while the operation unit 1 is changed from the totally closed state to the totally open state, the inter-center distance between the shaft portions 41a and 41b, the inter-center distance between the shaft portions 42a and 42b, and the inter-center distance between the shaft portions 43a and 43b are all maintained equal.

In the process of transition from the totally closed state of FIG. 12A to the totally open state of FIG. 12D, the fulcrums of all the links (the shaft portions 41a, 41b, 43a, and 43b) as seen sidewise are aligned in a straight line only in the state of FIG. 12B in which the operation unit is open by 4 degrees. In a four parallel link mechanism, an unstable system is likely to result when all the fulcrums are aligned in a straight line. In such an unstable system, a part of the links is likely to make movement in a direction reverse to the proper direction.

Figure 12E:
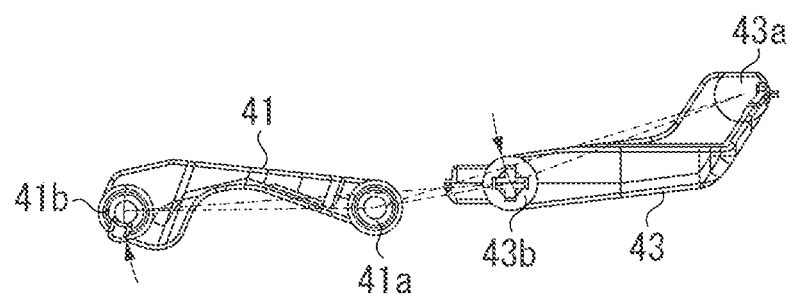
Figure 13:
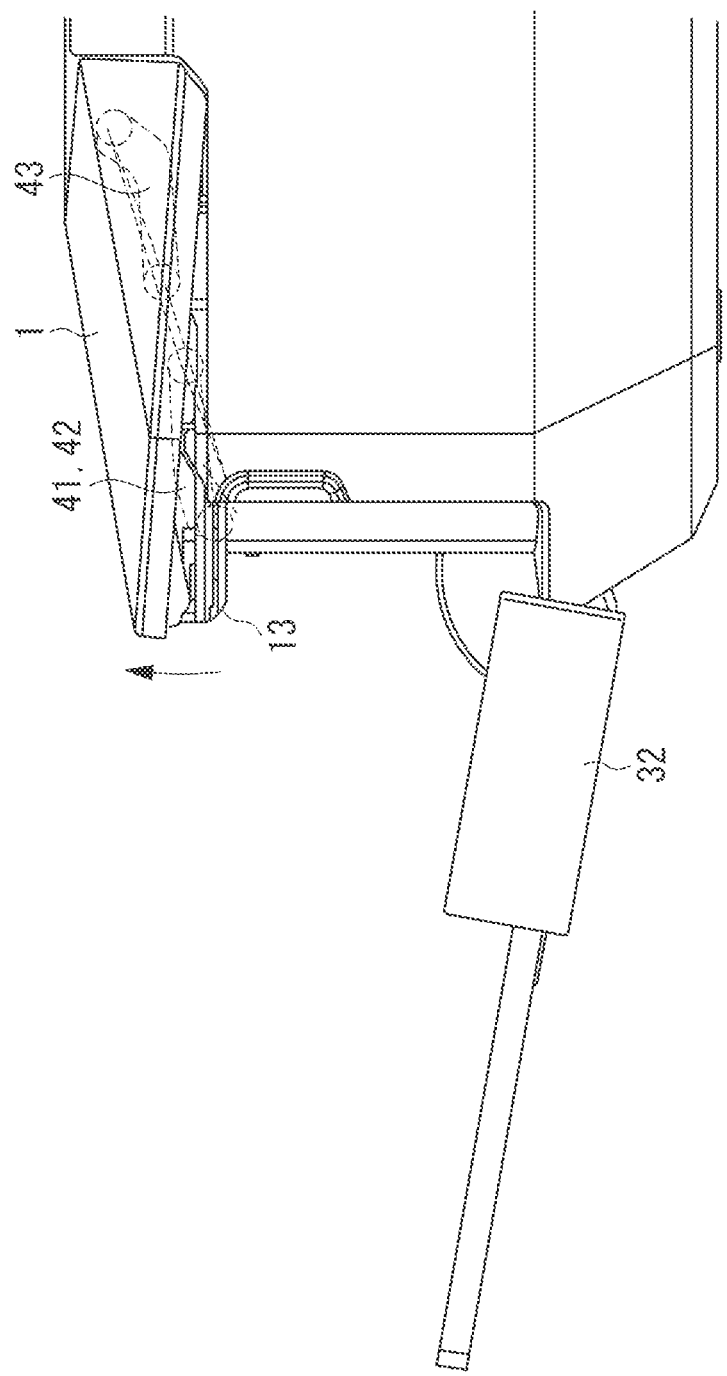
FIG. 13 is a diagram illustrating a state in which the operation unit has been opened in an opposite-phase mode.

By way of example, FIG. 12E illustrates a state in which only the rear link arm 43 has been allowed to move in an unintended direction. Properly speaking, the rear link arm 43 ought to rotate clockwise around the shaft portion 43a together with the left front link arm 41 (same-phase mode). In reality, however, solely the rear link arm 43 rotates counterclockwise (opposite-phase mode). FIG. 13 is a diagram illustrating a state in which the operation unit 1 has been opened in the opposite-phase mode. Solely the front side of the operation unit 1 is lifted, whereas the depth side thereof is lowered to be held in contact with the apparatus main body. In this condition, it is impossible to further move the operation unit 1.

Figure 14B:
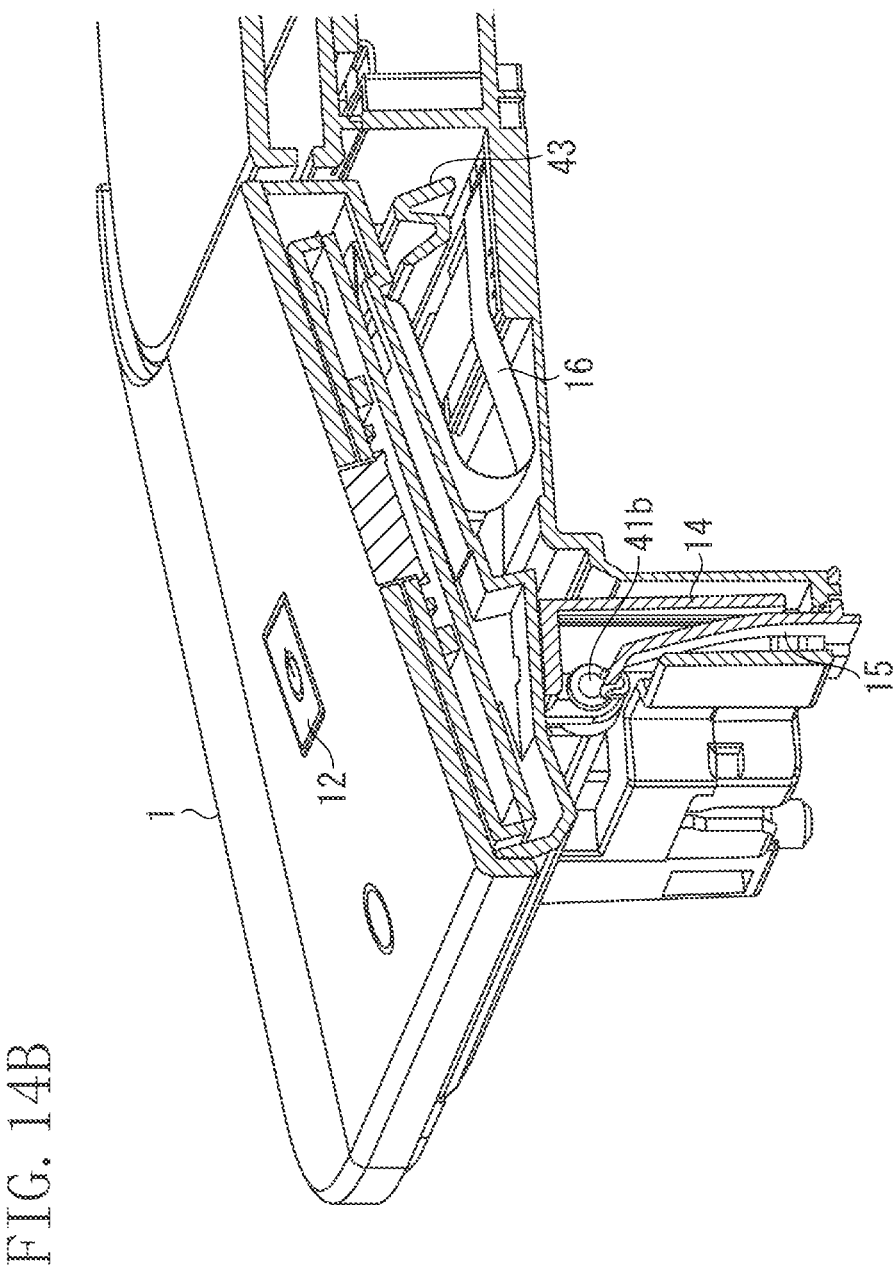
Figure 16:
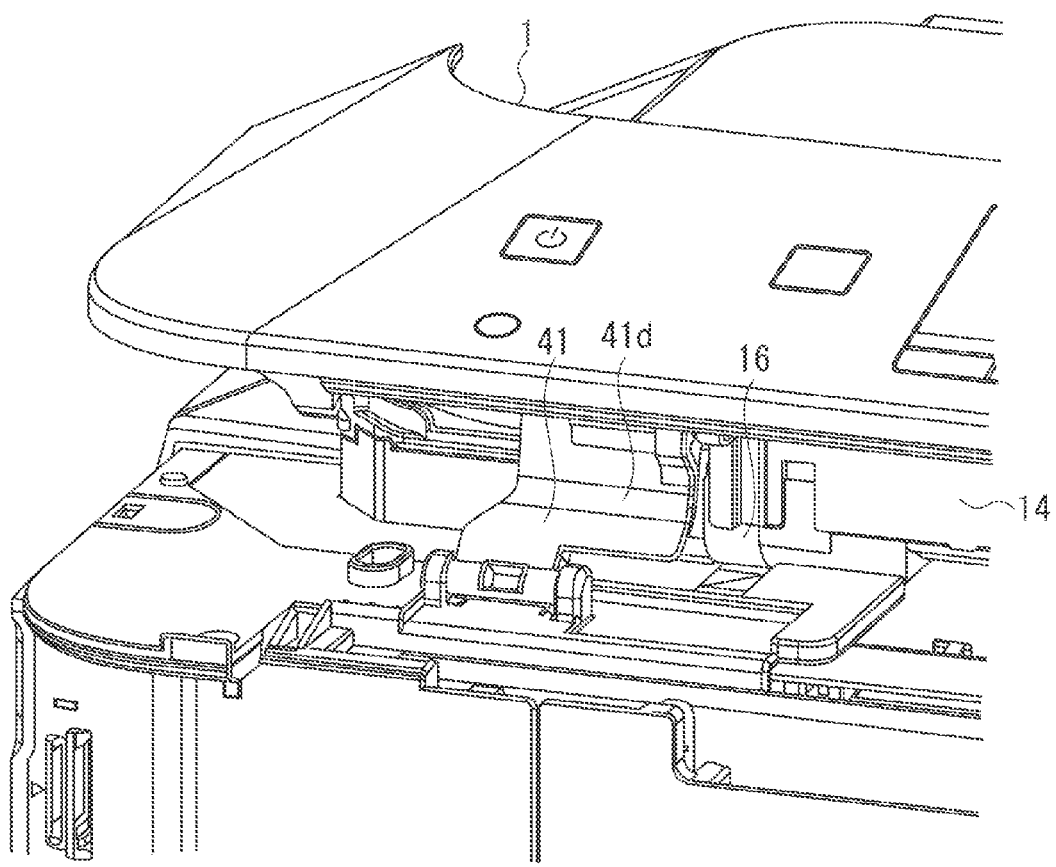
FIG. 16 is a perspective view for illustrating the routing of a flexible flat cable (FFC).

To avoid this, as illustrated in FIGS. 14A and 14B, according to the present exemplary embodiment, there is provided an urging member 15 to impart an urging force helping to avoid the opposite-phase mode at an angle close to 4 degrees at which the links of the four parallel link mechanism are aligned in a straight line. The urging member 15 is an elastic member formed of polyacetal resin or the like. The lower end thereof is fixed to the apparatus main body, and the upper end thereof is swingable.

FIG. 14A illustrates a state in which the operation unit 1 is totally closed. The ink mist cover 14 formed at the bottom portion of the operation unit 1 is not in contact with the urging member 15. Thus, the urging member 15 does not undergo any deformation but maintains its straight configuration. In contrast, in the state illustrated in FIG. 14B, the operation unit 1 has been rotated by 4 degrees. As described above, at this time, all of the fulcrums of the links of the four parallel link mechanism are aligned in a straight line, resulting in an unstable system likely to involve the opposite-phase mode. In the present exemplary embodiment, the positional relationship between the ink mist cover 14 and the urging member 15 is determined such that, immediately before this state is attained, the ink mist cover 14 and the urging member 15 begin to come into contact with each other.

This will be described in detail with reference to FIG. 15. Immediately before all the fulcrums of the parallel links are aligned in a straight line, the distal end portion of the ink mist cover 14 displaced to the front side comes into contact with the base portion of the urging member 15. The urging member 15 generates a force F pushing the lower end of the ink mist cover 14 toward the rear side as the reaction force thereof. As described above, the ink mist cover 14 is formed integrally with the operation unit 1, and the shaft portions 41b and 43b of the links are supported by the ink mist cover 14. Thus, owing to the force F, the shaft portion 43b receives a substantially upward (same-phase mode) urging force, suppressing transition of the rear link arm 43 to the opposite-phase mode.

In this way, when all the fulcrums of the parallel link mechanism are substantially aligned in a straight line, the ink mist cover 14 receives an urging force helping it to avoid being placed in the opposite-phase mode, so that a more reliable operation of the parallel link mechanism can be realized.

The routing of the electric cable between the operation unit 1 and the control unit (control circuit board) provided inside the apparatus main body will be described with reference to FIGS. 14A, 14B, 16, and 17. To drive various electrical components (display, keys, lamps, etc.) provided in the operation unit 1, the operation unit 1 and the control unit are connected to each other by a flexible flat cable (FFC) 16 serving as a signal wire.

In association with opening and closing of the operation unit, it is also necessary for the FFC 16 to undergo deformation following the movement thereof. When the bending R of the FFC 16 is too small, there is a fear of the FFC 16 being broken due to metal fatigue if the deformation is repeated. Further, when the FFC 16 runs through a conspicuous place, the hand of the user charged with static electricity may touch the FFC 16, so that there is a fear of erroneous operation of the control unit and the operation unit due to discharge.

Figure 17:
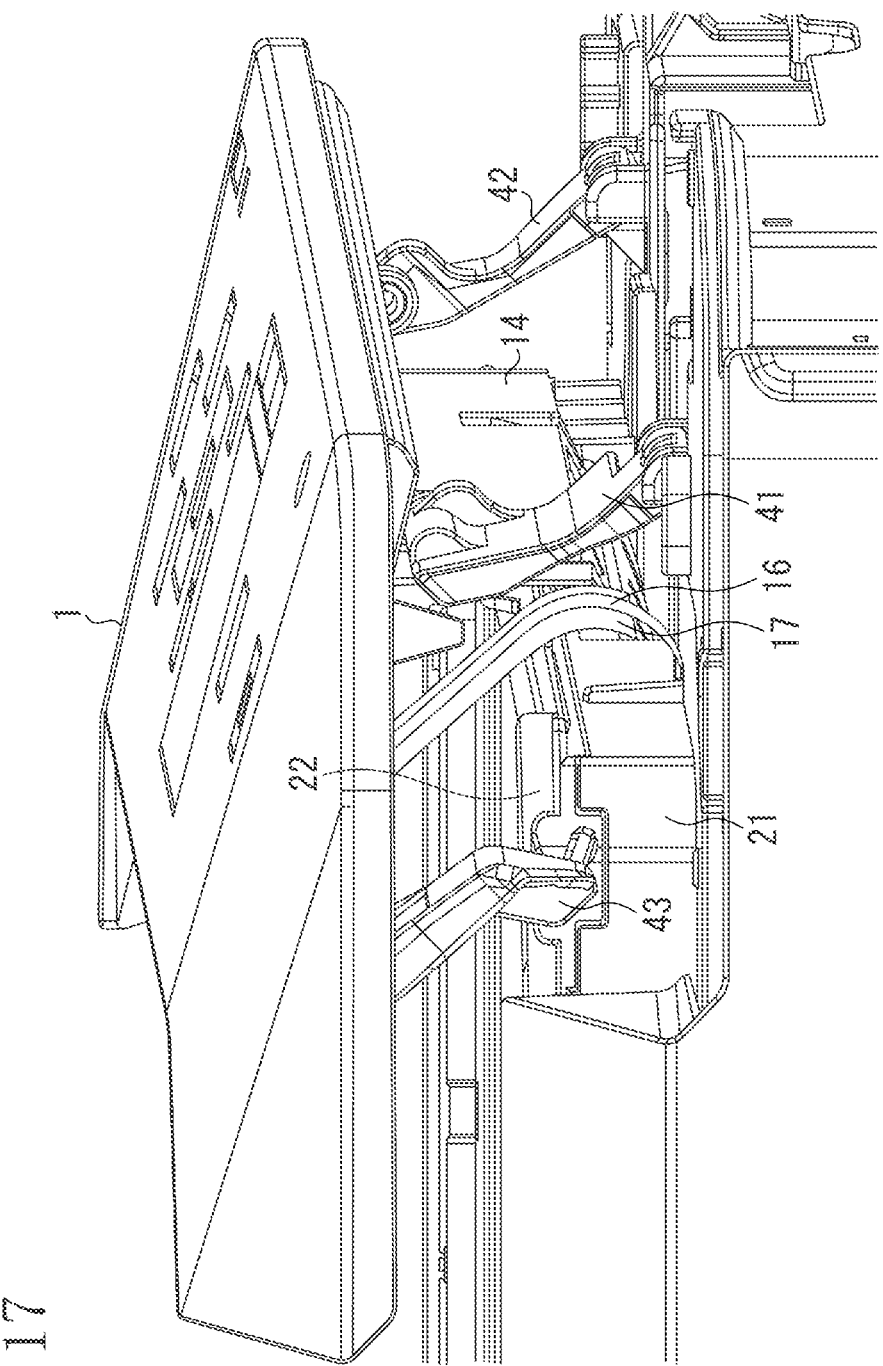
FIG. 17 is a perspective view for illustrating the routing of the FFC.

To avoid this, even when the operation unit 1 is placed in the totally closed state (FIG. 14A), the FFC 16 is caused to undergo bending R small enough not to involve metal fatigue (R=approximately 5 mm). In the totally open state of the operation unit 1 (FIGS. 16 and 17), the deformation of the FFC 16 is mitigated, and the FFC assumes a gently deflected configuration. At this time, the front side of the FFC 16 is arranged behind the protrusion 41d of the left front link arm 41 and the ink mist cover 14. Thus, these serve as protection walls to suppress touching the FFC 16 by the user. Further, as illustrated in FIG. 17, a sheet member 17 is provided behind the FFC 16 (on the rear side of the apparatus). Owing to the sheet member 17, it is possible to suppress the touching of the FFC by the user inserting a finger from behind.

In the printing apparatus according to the above-described exemplary embodiment, an operation unit capable of being opened and closed with respect to the housing is provided. When the operation unit is opened, the operation unit moves to a position where it hinders the opening and closing of the scanner, and at least a part of the printing unit is exposed. Thus, the maintenance of the interior of the apparatus is easy to perform, and, at the same time, it is possible to prevent the scanner cover from being inadvertently opened during maintenance.

Further, the operation unit is connected to the housing by the parallel link mechanism, and, at the time of opening and closing, the panel surface and the display surface of the operation unit are translated while maintaining substantially the same orientation. Thus, also during the movement, the angle of the panel surface and of the display surface is not changed, and the user experiences no incongruity. And, the user can easily perform the maintenance operation while watching maintenance information indicated on the display portion.

While the present disclosure has been described with reference to exemplary embodiments, it is to be understood that these exemplary embodiments are not limiting. The scope of the following claims is to be accorded the broadest interpretation so as to encompass all such modifications and equivalent structures and functions.

This application claims the benefit of Japanese Patent Application No. 2012-196874 filed Sep. 7, 2012, which is hereby incorporated by reference herein in its entirety.

What is claimed is:
1. A printing apparatus comprising:
   a printing unit located inside a housing;
   a scanner unit, including a cover, located above the printing unit; and
   an operation unit, including a display, configured to be opened with respect to the housing,
   wherein, when the operation unit is opened, the operation unit hinders opening of the cover and a part of the printing unit is exposed.
2. The printing apparatus according to claim 1, wherein the operation unit is connected to the housing by a parallel link mechanism, and
   wherein, the operation unit is opened and closed while the display maintains a similar orientation.

3. The printing apparatus according to claim 2, wherein the parallel link mechanism includes four arms, and
wherein two arms on a front side of the printing apparatus are independent and two arms on a rear side of the printing apparatus are integrated.

4. The printing apparatus according to claim 3, wherein shaft portions are formed at end portions of the arms, and
wherein hooks are endowed on the shaft portions, with a phase preventing detachment of the shaft portions when the operation unit is opened and closed.

5. The printing apparatus according to claim 3, further comprising an urging member configured to provide an urging force such that movement of the parallel link mechanism does not enter an opposite-phase mode.

6. The printing apparatus according to claim 3, wherein an electric cable drawn out of the operation unit is routed behind one of the arms on the front side of the printing apparatus.

7. The printing apparatus according to claim 1, further comprising a front door configured to be opened to the front side of the housing and configured to support a sheet used in the printing unit,
wherein, in a state in which both the operation unit and the front door are open, access to the printing unit is enabled for maintenance of the printing apparatus.

8. The printing apparatus according to claim 7, wherein, when the front door is opened, a hook portion configured to be used to open the operation unit appears,
wherein, when the front door is closed, the hook portion is hidden by the front door.

9. The printing apparatus according to claim 7, wherein an extender for supporting the sheet is stored in the front door,
wherein, when the front door is opened, the extender is rotated to extend out from the front door,
wherein, when the front door is closed, the extender is rotated to be stored inside the front door.

10. The printing apparatus according to claim 1, wherein a shock absorber is mounted to the inner side of the cover, and
wherein, when the operation unit is opened, with the cover being open, and then the cover is closed, the shock absorber abuts on a part of the operation unit.

11. A printing apparatus comprising:
a printing unit located inside a housing;
a scanner unit located above the printing unit; and
an operation unit, including a display, configured to be opened with respect to the housing,
wherein the operation unit is connected to the housing by a parallel link mechanism,
wherein, the operation unit is opened and closed while the display maintains a similar same orientation, and
when the operation unit is opened, a part of the printing unit is exposed.

12. The printing apparatus according to claim 11, further comprising a front door configured to be opened and closed to a front side of the housing and configured to support a sheet used in the printing state, and
wherein, when both the operation unit and the front door are open, access to the printing unit is enabled for maintenance of the printing apparatus.

13. The printing apparatus according to claim 12, wherein, when the front door is opened, a hook portion configured to be used to open the operation unit appears, and
wherein, when the front door is closed, the hook portion is hidden by the front door.

14. The printing apparatus according to claim 12, wherein an extender for supporting the sheet is stored in the front door,
wherein, when the front door is opened, the extender is rotated to extend out of the front door,
wherein, when the front door is closed, the extender is rotated to be stored in the front door.

15. The printing apparatus according to claim 11, further comprising an urging member configured to provide an urging force such that movement of the parallel link mechanism does not enter an opposite-phase mode.

* * * * *